United States Patent [19]
Cagan et al.

[11] 3,998,798
[45] Dec. 21, 1976

[54] MONELLIN, A SWEET POLYPEPTIDE DERIVED FROM FRUIT OF DIOSCOREOPHYLLUM CUMMINSII

[75] Inventors: Robert H. Cagan, Bryn Mawr; Morley R. Kare, Narberth; James A. Morris, Broomall, all of Pa.

[73] Assignee: The Trustees of the University of Pennsylvania, Philadelphia, Pa.

[22] Filed: Sept. 5, 1975

[21] Appl. No.: 610,677

Related U.S. Application Data

[63] Continuation of Ser. No. 317,662, Dec. 22, 1972, abandoned.

[52] U.S. Cl. .............................. 260/112 R; 426/548
[51] Int. Cl.[2] ................... A23J 1/00; A23L 1/236; A23J 1/14
[58] Field of Search .................. 260/112 R; 426/548

[56] References Cited
UNITED STATES PATENTS

| | | | |
|---|---|---|---|
| 3,687,693 | 8/1972 | Essiet | 260/112 UX |
| 3,826,795 | 7/1974 | Essiet | 260/112 R |
| 3,878,184 | 4/1975 | Dobry | 260/112 R |

OTHER PUBLICATIONS

Febs Letters, Mar. 1972, vol. 21, No. 1, pp. 88–90, Van der Wel.
Biochimica et Biophysica Acta, Jan. 1972, Morris et al., pp. 114–121.

*Primary Examiner*—Howard E. Schain
*Attorney, Agent, or Firm*—Philip S. Johnson

[57] ABSTRACT

Monellin, an intensely sweet polypeptide, substantially free from carbohydrate, is described. Monellin is the pure proteinaceous principle of the fruit *Dioscoreophyllum cumminsii*, having a molecular weight of approximately 11,000, an isoelectric point of 9.3, and an ultraviolet absorption maximum ($\lambda$ max) of 277 nm. A process for the production of monellin is described which includes the steps of extracting the fruit with an aqueous medium, separating the extract into a carbohydrate containing fraction and a proteinaceous fraction substantially free from carbohydrate, and recovering the proteinaceous fraction substantially free from carbohydrate.

1 Claim, 10 Drawing Figures

MONELLIN, A SWEET POLYPEPTIDE DERIVED FROM FRUIT OF DIOSCOREOPHYLLUM CUMMINSII

The invention described herein was made in the course of work under a grant or award from the Department of Health, Education, and Welfare.

This is a continuation of Application Ser. No. 317,662 filed Dec. 22, 1972 now abandoned.

BACKGROUND OF THE INVENTION

1. Field of the Invention

This invention relates to a novel proteinaceous sweetening compound which is substantially free from carbohydrate.

2. Description of the Prior Art.

In recent years, much effort has been expended in the search for natural and synthetic sweetening agents as sugar substitutes in the dietetic and pharmaceutical fields. The pure crystalline glycoside stevioside in known to be 300 times as sweet as sucrose. Miraculin, a glycoprotein containing both amino acids and sugars, has been found to convert a sour tasting substance into a sweet taste after the mouth is rinsed with miraculin. The stable solid form of miraculin is the subject matter of U.S. Pat. No. 3,676,149, the disclosure of which is incorporated herein and made a part hereof. Investigators have attempted to isolate and purify the taste effecting principles of the fruit of plants including *Dioscoreophyllum cumminsii* (Stapf) Diels, otherwise known as Serendipity Berries. This plant is found in several regions of tropical Africa, including the Congo, where the fruit is eaten by the natives. Inglett and May, Journal of Food Science, Vol. 34, pp. 408–411 (1969) reported that the sweet principle of *Dioscoreophyllum cumminsii* was a carbohydrate type substance which was bound to fruit protein, although not proteinaceous. They postulated that the active principle might be an aglycone glycoside. U.S. Pat. No. 3,687,693, the disclosure of which is incorporated herein and made a part hereof identifies a water soluble sweetening material of *Dioscoreophyllum cumminsii* as being a carbohydrate having a molecular weight of the order of 10,000.

SUMMARY OF THE INVENTION

We have surprisingly discovered that the intensely sweet principle of the fruit of *Discoreophyllum cumminsii* is a polypeptide, substantially free from carbohydrate, and we have discovered a method for the isolation of this principle. We have named the pure principle Monellin. The molecular weight of monellin has been estimated by five methods and the values were within the range of from 8,900 to 11,200 daltons. The molecular weight calculated from amino acid analysis is 10,700 daltons and the protein itself consists of a single polypeptide chain of approximately 91 amino acids. This novel protein contains no histidine, and only one residue each of tryptophan, cysteine and methionine are present. It contains no mono — or dimethyl derivatives of lysine or arginine. Fifteen basic residues (Lys + Arg) and 22 acidic residues (Asp + Glu) are present, but up to six of the latter may be in the amide form. Isoelectric focusing established the isoelectric point of monellin to be 9.3. The molar extinction coefficient (based on 10,700 M.W.) at pH 7.20 is $1.47 \times 10^4 M^{-1} cm^{-1}$ ($\lambda max=277$ nm), and at pH 12.8 it is $1.83 \times 10^4 M^{-1} cm^{-1}$ ($\lambda max=290$ mm).

Monellin is produced by the process of this invention by (1) establishing an aqueous extract of the fruit of the plant *Dioscoreophyllum cumminsii*, (2) forming from said extract a mixture of a carbohydrate containing fraction and a proteinaceous fraction substantially free from carbohydrate, and (3) recovering said proteinaceous fraction substantially free from carbohydrate.

DESCRIPTION OF THE PREFERRED EMBODIMENT

EXAMPLE 1

Fresh branches of berries of the plant *Dioscoreophyllum cumminsii* (Stapf) Diels were shipped by air from Ghana, West Africa. Upon arrival they were kept under refrigeration (4° C) until extracted. Usually extraction was carried out within 24 hours of arrival. The berries were picked from the branches, washed carefully with deionized water, gently blotted dry, and weighed. All extraction procedures were carried out at room temperature (22°–25° C). The seed with its attached mucilaginous pulp was separated from the skin. The seeds plus pulp were weighed and then extracted with a volume of deionized water equivalent to twice their wet weight. Extraction was carried out for one hour with gentle periodic stirring in order to avoid breaking any seeds. Solid material was allowed to settle and the supernatant was decanted. This procedure was repeated once or twice more and the extracts were then stored at −15° C.

Purification Procedure

Following extraction, all subsequent steps were carried out in the cold (0°–4° C). The buffer solution used for all procedures was 0.01 M sodium phosphate (pH 7.2) unless stated otherwise.

$(NH_4)_2SO_4$ fractionation.

Dry $(NH_4)_2SO_4$ was added with constant stirring to the crude extract to 40% saturation (243 g/l). Following equilibration for 1 hour, the supernatant was carefully decanted and clarified by centrifuging at 20,000 × g for 10 minutes. The brown precipitate was discarded and the clear, yellow supernatant was brought to 60% saturation (132 g/l) and equilibrated for 1 hour. Following centrifugation (20,200 × g for 10 min.) the supernatant (S60) was decanted and saved for analysis. The jellylike, brown precipitate (P 40–60) was dissolved by stirring overnight with a volume of phosphate buffer equal to 10–20% of the volume of the original crude extract. The resultant extremely viscous, brown solution was dialyzed overnight against the phosphate buffer. An aliquot of the supernatant (S60) was also dialyzed in similar fashion. It is necessary to check the supernatant in this way because some preparations, which are more dilute initially, require a higher $(NH_4)_2SO_4$ concentration to precipitate all of the sweet principle.

DEAE — cellulose chromatography.

Figure 1:
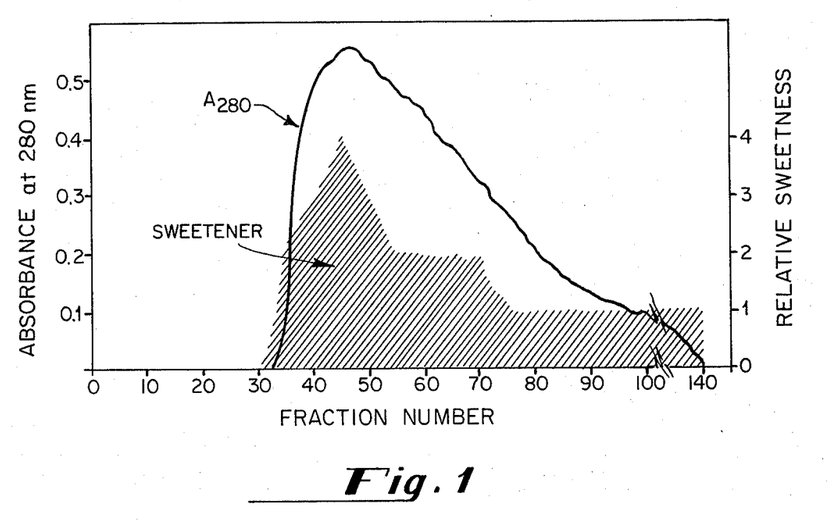
FIG. 1 is a graph of the ultraviolet absorption and relative sweetness of fractions of the extract utilized in the production of the product of this invention.

A 5.0 cm × 17.0 cm DEAE-cellulose (Cellex-D) column was equilibrated with the phosphate buffer and a 498 mg sample of dialyzed P 40–60 fraction was adsorbed on the column. Elution at a flow rate of 26 ml/h of 0.01 M sodium phosphate 4, (pH 7.2) was carried out, collecting fractions of approximately 8.5 ml. each. The absorbance of the column eluate at 280 nm was continuously monitored, as shown in FIG. 1, and a large broad peak of 280-nm absorbing material, which contained the sweet principle was eluted. Sweetness was detected in all fractions of this peak, as indicated by the shaded area. Fractions 101–140 was pooled and tested as a single sample. For this column, sweetness was evaluated subjectively on every fifth tube using a five-point scale of 0–4 and is expressed on the righthand scale of FIG. 1 as relative sweetness. Apparently because of the viscous nature of the P 40–60 fraction, considerable tailing on the column was encountered, resulting in a large number of rather dilute fractions. Fractions 34–100 (FIG. 1) were pooled for further purification. The solution containing the sweetener was, at this point, slightly brown in color and very dilute (0.5 mg protein per ml). No additional ultraviolet-absorbing material was eluted by stepwise additions of NaCl up to 0.5 M. A dark brown bend remained at the top of the column; this could be eluted with 1 M NaOH. An aliquot of this material was dialyzed against water to remove the NaOH and was found to have no sweet taste. This material was discarded.

CM — cellulose chromatography.

Figure 2:
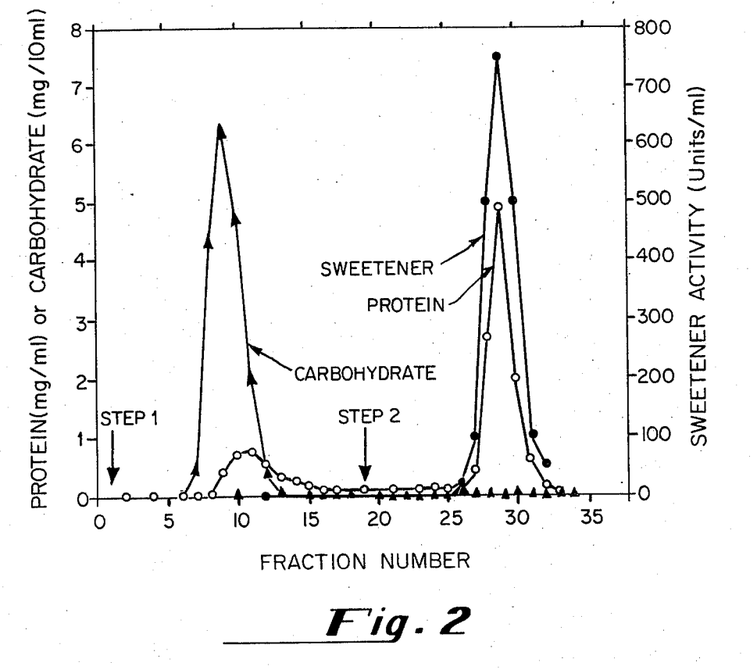
FIG. 2 is an elution profile of a chromatographic column utilized in the production of the product of this invention.

A column of 4.8 cm × 8.0 cm CM-cellulose was equilibrated with the phosphate buffer. A pooled eluate of the active fractions from DEAE-cellulose chromatography was concentrated by precipitating the sweetener with ammonium sulfate (80% saturation, 561 g/l). Following dialysis against the phosphate buffer, a sample containing 210 mg protein was adsorbed onto the CM-cellulose column. Elution was begun (FIG. 2, step 1) with the equilibrating buffer at a flow rate of 25 ml/h, and fractions of approximately 10 ml were collected. A single peak of 280-nm-absorbing material was eluted. When the absorbance returned to zero, the eluting buffer was changed to 0.01 M phosphate (pH 7.2) containing 0.1 M NaCl (FIG. 2, step 2). This step eluted a single large peak containing the sweet principle. Fractions containing this sweetener were pooled and stored at 4° C.

Results

The quantitative results of a typical purification as above described are shown in Table 1.

Protein and carbohydrate analyses.

Protein was determined with the biuret reagent (A. G. Gornall, C. J. Bardawill and M. M. David, J. Biol, Chem., 177 (1949) p 751) during purification through the $(NH_4)_2SO_4$ step (protein concentration > 1 mg/ml). For subsequent purification steps the more sensitive method of Lowry et al. (O. H. Lowry, N. J. Rosebrough. A. L. Farr and R. J. Randall, J. Biol, Chem., 193 (1951) p. 265) was used with minor modification. Bovine serum albumin was used as the standard. Determinations on the same sample using both methods yielded comparable results.

Carbohydrate concentration was routinely estimated with the phenol-sulfuric acid method (J. E. Hodge and B. T. Hofreiter, in R. L. Whistler and M. L. Wolfrom, Methods in Carbohydrate Chemistry, Vol. 1, Academic Press, New York, 1962, p. 380; M. Dubois, K. A. Gilles, J. K. Hamilton, P. A. Rebers and F. Smith, Anal. Chem., 28 (1956) p. 350); the highly purified samples were also checked using the anthrone reagent (T. A. Scott, Jr. and E. H. Melvin, Anal. Chem., 25 (1953) P. 1656). Glucose was used as the standard; carbohydrate content is expressed in terms of glucose equivalents.

Sweetener assay.

Initially the presence of sweetener was detected by tasting a 1:10 dilution (with water) of each fraction. The mouth was rinsed with deionized water twice before beginning the assay and once between samples. Sample size was usually 2–5 ml. The sweetener solution was held in the mouth for approximately 5 seconds and then spit out. Sweetener activity was approximately quantified by determing the dilution required to reach the threshold level for sweetness (the concentration at which the solution is first recognized as sweet). The sweetener activity (in units/ml) is arbitrarily defined as the dilution factor required to reach this threshold level. For example, a sample that could be diluted 500-fold and retain its sweetness contains 500 units/ml. Specific activity is then defined as units/mg protein.

In earlier experiments, samples were dialyzed against water prior to taste-testing. However, it was found during the course of testing that active samples were diluted at least 50 to 100-fold, and often 1,000-fold. Thus, the original concentration of phosphate (0.01 M) was always substantially reduced. In addition, it was observed that some turbidity developed when samples were dialyzed against water. Therefore subsequent taste-testing was generally done with samples originally in 0.01 M sodium phosphate buffer (pH 7.2), which were then appropriately diluted with deionized water. Thus the taste tests were done in phosphate buffer at concentrations of <0.2 mM. The $(NH_4)_2SO_4$ fractions were tested following dialysis, the fractions from the DEAE-cellulose as they emerged from the column, and those from the CM-cellulose column after dialysis against the phosphate buffer.

EXAMPLE 2

Figure 3:
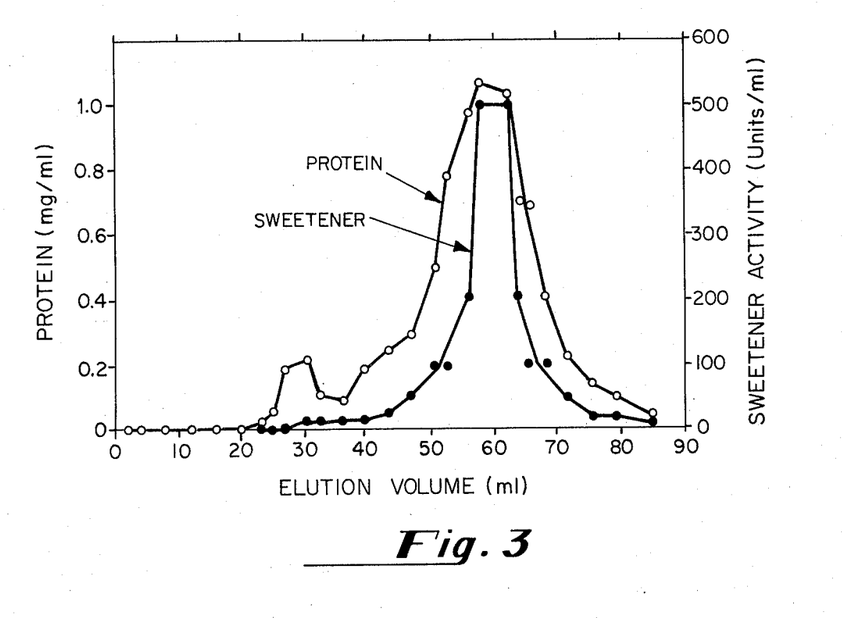
FIG. 3 is a profile similar to FIG. 2.
Figure 4:
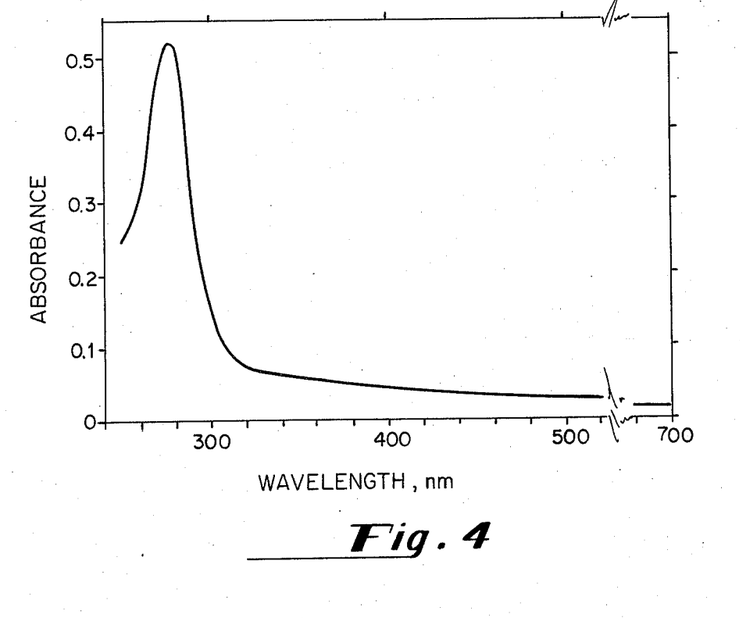
FIG. 4 is an absorption spectrum of a purified product of this invention.

The active eluate from the column of CM-cellulose (Example 1; CM-cellulose eluate-Table 1) was pooled, concentrated by dialysis against dry polyethylene glycol (polyethylene glycol compound 20-M, Union Carbide Chemicals Co., Charleston, W. Va. This was first purified by extensive dialysis against water and then dried) and a 2.0 ml aliquot (containing 36 mg protein) was adsorbed onto a 1.0 cm × 24.0 cm CM-cellulose column. Elution was effected with a gradient that was linear in NaCl concentration from 0 to 0.05 M (pH 7.2). Flow rate was 6.5 ml/h; fraction size was approximately 2 ml (30 drops). The gradient was started at Fraction 1 and the ultraviolet absorbance of the eluate was monitored as in Example 1. As seen in FIG. 3 the sweetener was eluted as a single large peak preceded by a much smaller protein peak containing little or no sweetener. This purified monellin exhibits a strong absorption in the ultraviolet region ($\lambda$max.=277 nm), as shown in FIG. 4. Alternatively, purification of the sweet principle may be effected by adsorption chromatography.

The eluate of sweet material was dialyzed against deionized water, lyophilized, stored at −15° C, and subjected to the following determinative analyses:

Materials — SDS (sodium dodecyl sulphate); hemoglobin (bovine, 2× crystallized); $\alpha$-chymotrypsin (bovine pancreas, 3× crystallized); ovalbumin (egg white, 2× crystallized); chymotrypsinogen A (beef pancreas, 6× crystallized); myoglobin (sperm whale, crystallized); cytochrome $c$ (horse heart, amorphous powder); trypsin (bovine pancreas, 2× crystallized); Sephadex G-100; Blue Dextran 2000; p-dimethylaminobenzaldehyde; D, L-tryptophan. All other chemicals were reagent grade.

SDS-Gel Electrophoresis — The apparent molecular weight of monellin was estimated by electrophoresis in 10% polyacrylamide gels containing SDS according to the method of Dunker and Rueckert (Dunker, A. K. and Rueckert, R. R. (1969) *J. Biol. Chem.* 244, 5074–5080). Gels approximately 6.5 cm long were prepared in 7.5 cm × 0.5 cm (internal diameter) glass columns. Electrophoresis was carried out in 0.05 M sodium phosphate buffer, pH 7.1, in the presence of 0.1% (w/v) SDS, at a constant current of 4 mA per gel. Protein samples were prepared at a concentration of 2.0 mg/ml; 10–40μg of individual proteins were applied to a single gel. Gels were stained with Coomassie Brilliant Blue R250 (Colab Laboratories, Chicago Heights, Illinois) and destained as described by Weber and Osborn (Weber, K. and Osborn, M. (1969) *J. Biol. Chem.* 244, 4406–4412). Electrophoresis was carried out on various mixtures of the standard proteins with and without monellin present. The identity of each protein was first established by running it alone (with chymotrypsinogen A). The relative mobility of each protein was calculated as described (Dunker and Rueckert, Supra).

Gel Filtration — Gel filtration was carried out according to the method of Andrews (Andrews, P. (1964) *Biochem. J.* 91, 222–232), on a 2.5 × 88 cm column of Sephadex G-100 at 4° in 0.01 M sodium phosphate buffer, pH 7.26, containing 0.2 M KCl. Flow rate was maintained at 15 ml/hr and fractions of 30 drops (1.95 ml) were collected. The absorbance of the effluent at 280 nm was monitored continuously and the $A_{280}$ of each fraction was also measured at the completion of the experiment. To minimize possible protein-protein interactions, the proteins (10 mg in 1.0 ml) were applied to the column in the order of decreasing molecular weight. Each was followed by a 10-ml aliquot of the equilibrating buffer. Monellin was added last. Appropriate corrections in elution volumes were made for the additions of buffer. The location of the monellin peak was confirmed by its sweet taste.

Standard amino acid analysis — Samples of protein (1.0 mg) were hydrolyzed in 1.0 ml of constant-boiling HCl containing 4% (v/v) thioglycolic acid (Matsubara, H. and Sasaki, R. M. (1969) *Biochem. Biophys. Res. Commun.* 35, 175–181), for 24 hr. at 110° in an evacuated desiccator (Dreyer, W. J., and Bynum, E. (1967) in *Methods in Enzymology*, Vol. XI (Hirs, C.H.W., ed.) pp. 32–39, Academic Press, New York). Hydrolyzates were evaporated to dryness over NaOH pellets in vacuo and dissolved in 2.0 ml of 0.2 N sodium citrate, pH 2.2, frozen, and stored at −10°. Analyses were carried out with a Beckman 120C amino acid analyzer utilizing Beckman AA-27 and AA-15 resins. The standard 4-hr system operated at high sensitivity was used. Peak integration was performed with an Infotronics CRS 110A integrator with digital printout. Samples of 250 $\mu$l (equivalent to 125 $\mu$g of protein) were applied to the columns with Beckman manual sample injectors.

Tryptophan content was estimated in the intact protein by the method of Spies and Chambers (Spies, J. R. and Chambers, D. C. (1949) *Anal. Chem.* 21, 1249–1266). Assays were performed according to procedure K, of Spies and Chambers (Supra) and the tryptophan content was calculated from the standard curve prepared with free D, L-tryptophan. The spectral procedure of Edelhoch (Edelhoch, H. (1967) *Biochemistry* 6 1948–1954), was also used to determine the contents of tyrosine and tryptophan in the intact protein.

Analysis for methylated basic amino acids — A sample of protein (2.0 mg) was subjected to acid hydrolysis as described above, but without thioglycolic acid. The hydrolyzate was then evaporated as described above and dissolved in 1.0 ml of the citrate buffer. A 250 $\mu$l sample (equivalent to 0.5 mg of protein) was chromatographed on a 0.9 × 30 cm column of Durrum DC-2A resin. Traces of $N^{\epsilon}$-monomethyllysine, $N^{\epsilon}$-dimethyllysine, 3-methylhistidine, $N^G$, $N^G$-dimethylarginine, $N^G$, $N'^{G}$-dimethylarginine, and $N^G$-monomethylarginine are readily identified and quantitated in acid hydrolyzates of proteins by this procedure.

Performic acid oxidation — Performic acid oxidation of a sample of monellin (1.0 mg) was carried out as described by Hirs (Hirs, C. H. W. (1967) in *Methods in Enzymology*, Vol. XI (Hirs, C. H. W., ed.) pp. 59–62, Academic Press, New York).

Isoelectric Focusing — The isoelectric point of monellin was determined by isoelectric focusing in an LKB Ampholine Column, Model 8100 (LKB-Produkter AB, Sweden); the experiments were performed at 3.9° ± 0.1° according to the manufacturer's instruction manual. Voltage was held constant at 600 V. Focusing was terminated when the current reached a constant level of 0.40 mA (216 hrs). Following the run, fractions (30 drops) were collected, and the pH (at 4°) and $A_{277}$ were measured. Appropriate fractions were dialyzed overnight against deionized water and assayed for sweetness (Morris, J. A. and Cagan, R. H. (1972) *Biochim. Biophys. Acta* 261, 114–122). Electrode solutions were 1% (w/v) NaOH (cathode) and 1% (v/v) $H_2SO_4$ (anode). Ampholyte concentration was 1% (w/v).

Spectral Measurements — The ultraviolet absorption spectrum of monellin was measured with a Cary 14 recording spectrophotometer at room temperature (22°). For determining the extinction coefficients, lyophilized monellin was dried to constant weight (4 days) under vacuum with $P_2O_5$ as the drying agent. The protein (weighed to ± 0.1%) was then dissolved in 0.01 M sodium phosphate buffer, pH 7.20. This stock solution was diluted with the same buffer to give a solution with an absorbance (at 277 nm) in the range of 0.7 to 1.0. Absorption measurements of triplicate samples were made in a Zeiss PMQ II spectrophotometer. Samples for measurements at pH 12.8 were prepared by diluting the stock solution with 0.1 N NaOH instead of buffer. Fluorescence spectra were measured with a Perkin-Elmer Model MPF-2A fluorescence spectrophotometer at 20.0° ± 0.2°, and are uncorrected.

Figure 5:
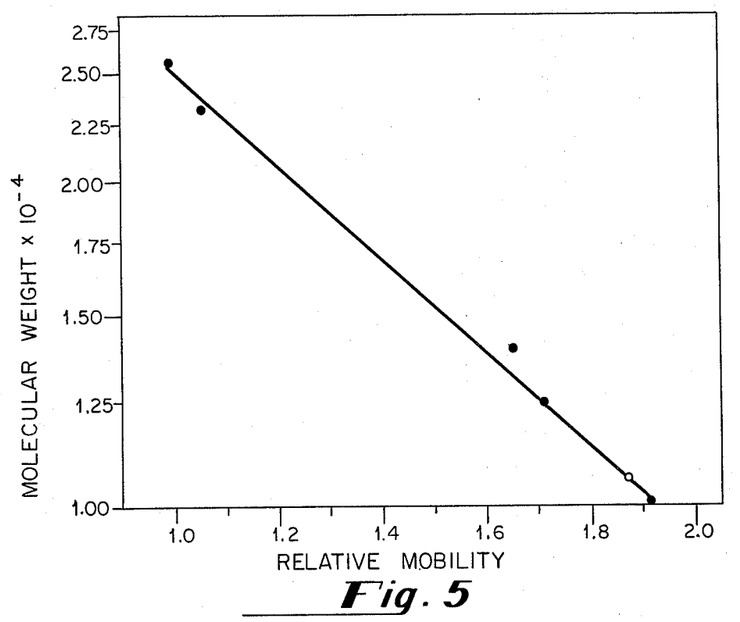
FIG. 5 is a graph showing the estimation of the molecular weight of the product of this invention by electrophoresis.

The following results were obtained:

Molecular Weight — Only a single electrophoretic component was observed after treatment of monellin with SDS and mercaptoethanol, a procedure known to dissociate proteins into their constituent polypeptide chains (Trayer, H. R., Nozaki, Y., Reynolds, J. A., and Tanford, C. (1971) *J. Biol. Chem.* 246,4485–4488). This observation is consistent with monellin being a single polypeptide chain. It is conceivable from this evidence alone, however, that monellin could consist of two or more polypeptide chains of identical length. The molecular weight of the polypeptide chain(s) estimated by SDS-gel electrophoresis (FIG. 5) is 10,500. The data are the results from three separate experiments, and each point on the standard curve represents the mean of at least 17 individual gels. The relative mobility of monellin is indicated by the open circle. The marker proteins used, and their molecular weights, from left to right, are: chymotrypsinogen A, 25,800 (Maroux, S. and Rovery, M. (1966) *Biochim. Biophys.,. Acta* 113, 126–143); trypsin, 23,300 (calculated from data in Dayhoff, M. O., ed. (1969) *Atlas of Protein Sequence and Structure*, Vol. 4, National Biomedical Research Foundation, Silver Spring, Maryland); chymotrypsin B chain, 13,900(Maroux and Rovery, Supra); cytochrome c, 12,400 (Margoliash, E., 1962 *J. Biol. Chem.* 237, 2161–2174); chymotrypsin C chain, 10,200 (Maroux and Rovery, Supra).

Figure 6:
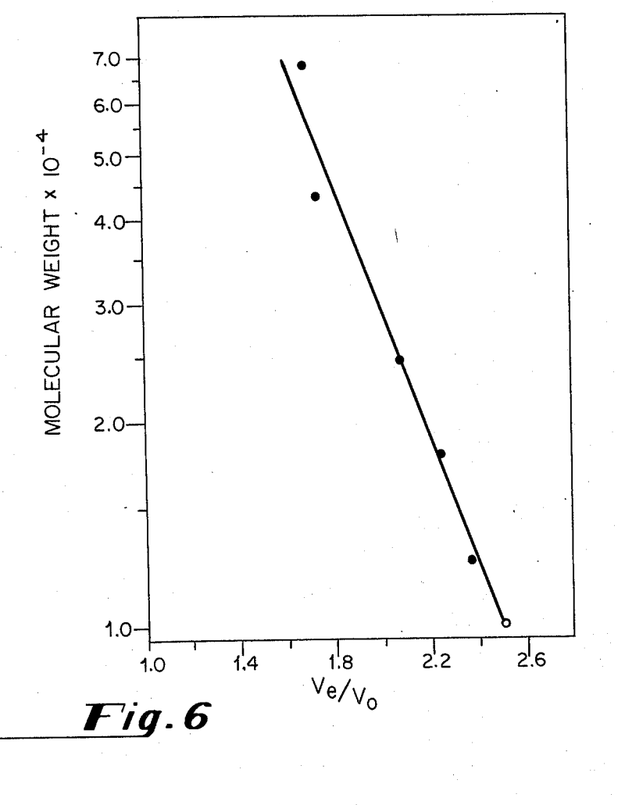
FIG. 6 is a graph showing the estimation of the molecular weight of the product of this invention by gel filtration.

The molecular weight of native monellin was examined by gel filtration through Sephadex G-100 (FIG. 6). The elution volume ($V_e$) is the volume eluted prior to the emergence of the peak fraction for each marker protein. The void volume ($V_o$) is the volume eluted prior to the peak fraction of Blue Dextran 2000. The ratio ($V_e/V_o$) for monellin is indicated by the open circle. The marker proteins and their molecular weights used are, from left to right: hemoglobin, 66,300 (Castellino, F. J. and Barker, R., 1968, *Biochemsitry* 7, 2207–2217), ovalbumin, 43,000 (Castellino and Barker, Supra), α-chymotrypsin, 25,300 (Maroux and Rovery, Supra), myoglobin, 17,800 (calculated from data in Dayhoff, Supra), and cytochrome c, 12,400 (Margoliash, Supra). The single experiment showed that the sweet-tasting activity was associated with a protein having a molecular weight value of approximately 10,000. Since the native protein and the "reduced and dissociated" protein have virtually the same molecular weight, the molecule of monellin must consist of a single polypeptide chain. The minimal molecular weight, calculated from the content of tryptophan in the intact protein was found to be in good agreement with the above values.

Amino acid analysis — Acid hydrolysis of monellin was generally carried out in the presence of thioglycolic acid (4% v/v) to preserve tryptophan (Matsubara, Supra) and prevent oxidation of methionine and tyrosine (Matsubara, Supra; Sletten, K., Dusk., deKlerk, H., and Kamen, M.D., 1968, *J. Biol. Chem.* 243, 5492–5506). Calculation of the moles of each amino acid recovered relative to 1.00 mole of methionine (Table II) yielded a minimal molecular weight for the protein of 10,700. This value, in conjunction with those obtained from SDS-gel electrophoresis (10,500) and gel filtration (10,000), demonstrates that the polypeptide chain contains a single residue of methionine The data in Table II also show that the molecule contains 3 residues of alanine, an amino acid that is known to be recovered quantitatively under these conditions. No histidine was detected by standard amino acid analyses.

Chemical (Spies and Chambers, Supra) and spectrophotometric (Edelhoch, Supra) determinations of tryptophan in the intact protein showed the presence of 0.95 ± 0.02 (S.D.) and 1.20 moles of tryptophan, respectively, per 10,700 grams of protein. The somewhat high value obtained in the standard analysis for tryptophan shown in Table II appears to have been due to incomplete separation of this amino acid from lysine during chromatography on the short AA-27 resin column.

Another sample of monellin was oxidized with performic acid. The oxidized protein and an untreated control were hydrolyzed in the absence of thioglycolic acid. These amino acid analyses (Table III) showed the presence of very nearly 1 mole each of cysteic acid and methionine sulfone per 3 moles of alanine (i.e., per mole of oxidized protein). the recovery of cysteic acid was 89% and compares favorably with values of 90–95% reported by Hirs (Supra). Tyrosine was completely destroyed upon treatment of the protein with performic acid. Loss of tyrosine was accompanied by the appearance of a relatively large peak of 570 nm-absorbing material that emerged from the AA-27 resin column just prior to lysine in the region of tryptophan and which caused an erroneously high integration of lysine due to overlap. The recoveries of all of the other amino acids were essentially identical in both performic acid oxidized and control proteins (Table III).

In order to determine if any of the lysyl or arginyl residues in monellin are methylated, analysis for basic amino acids was carried out on a column of Durrum DC-2A resin. Peaks were observed corresponding to lysine, arginine and ammonia. No mono- or dimethyl derivatives of lysine or arginine were present. Trimethyllysine, if present, would probably have been detected in this sytem. The results of the standard analyses (Tables II and III) indicated the presence of 7 arginyl residues per mole of protein. The quantity of lysine relative to 7.00 moles of arginine was 7.64.

In Table IV is presented the amino acid composition of monellin arrived at by averaging the results of several standard analyses. These data indicate that monellin consists of approximately 91 amino acid residues and has a molecular weight of approximately 10,700.

It is clear, therefore, that the agreement is excellent among the values for the molecular weight of monellin determined by various methods. Monellin is therefore an order of magnitude larger than previously known sweet molecules. The sweet taste of a small molecule is usually extremely sensitive to chemical modification. Often very minor changes in the structure result in complete loss of sweetness. The relatively large size of monellin and its variety of side chains should permit a number of chemical modifications in attempts to elucidate the chemical features essential for its biological activity as well as to attach particular labeling groups for binding studies.

Figure 7:
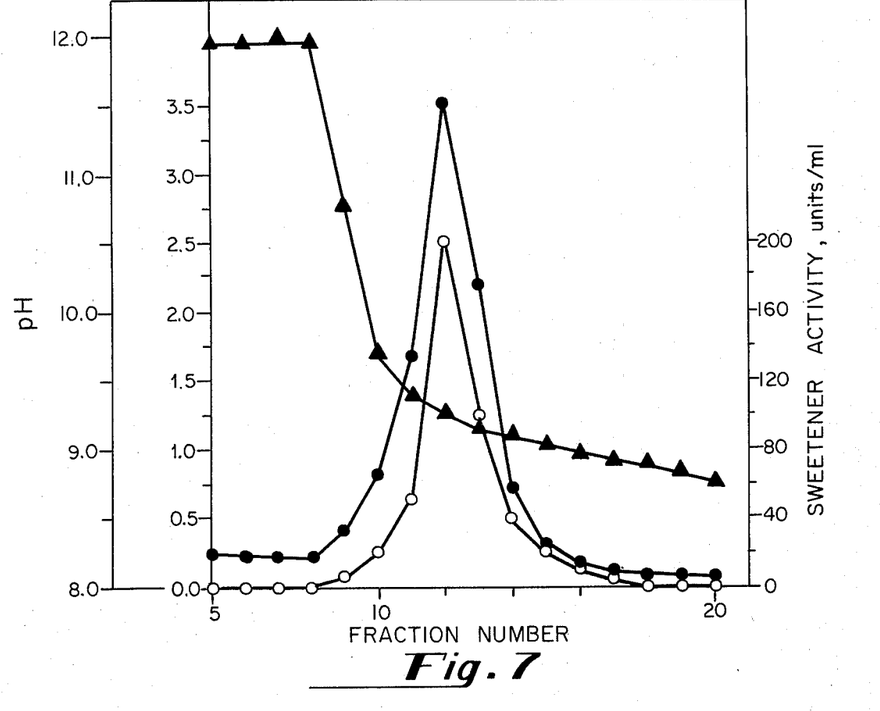
FIG. 7 is a graph showing the determination of the isoelectric point of the product of this invention by isoelectric focusing.

Isoelectric point — The isoelectric point was determined by isoelectric focusing in a pH gradient from pH 7.0 to pH 10.0. Data from one experiment are shown in FIG. 7; the isoelectric point here is 9.26. Fifteen milligrams of monellin were incorporated into the pH gradient (pH 7–10). (●—●) absorbance at 277 nm: (0—0) sweetener activity in arbitrary units/ml; (▲—▲) pH. In a second experiment, the value obtained was 9.31.

Figure 8:
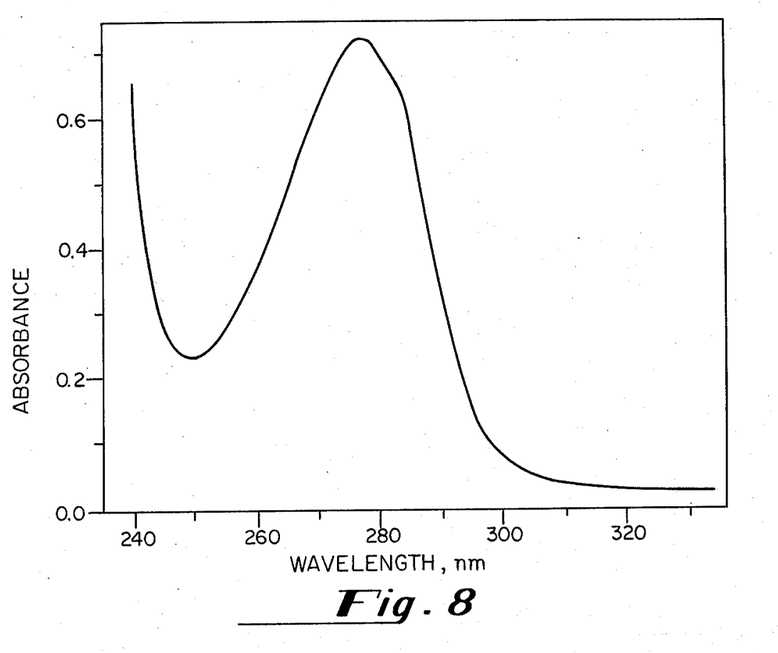
FIG. 8 is an absorption spectrum similar to FIG. 4.

Spectral Measurements — The ultraviolet absorption spectrum of monellin (FIGS. 4 and 8) is similar to those of many other proteins. Protein concentration (FIG. 8) was 0.519 mg/ml. The spectrum was measured in 0.01 M sodium phosphate buffer, pH 7.20 in quartz cuvettes of 1 cm path length against a phosphate buffer blank. The max occurs at 277 nm. Significant absorption occurs at 288 nm, which is characteristic of the tryptophan indole chromophore (Edelhoch, Supra). The values for $E_{1\,cm}^{1\%}$ and the molar extinction coefficients (M. W. 10,700) at pH 7.20 and 12.8 are presented in Table V. The shift in λ max from 277 nm to 290 nm at pH 12.8 due to ionization of tyrosine is also accompanied by a complete loss of the sweet taste, but any connection between the ionization of tyrosine and loss of activity remains to be determined.

Figure 9:
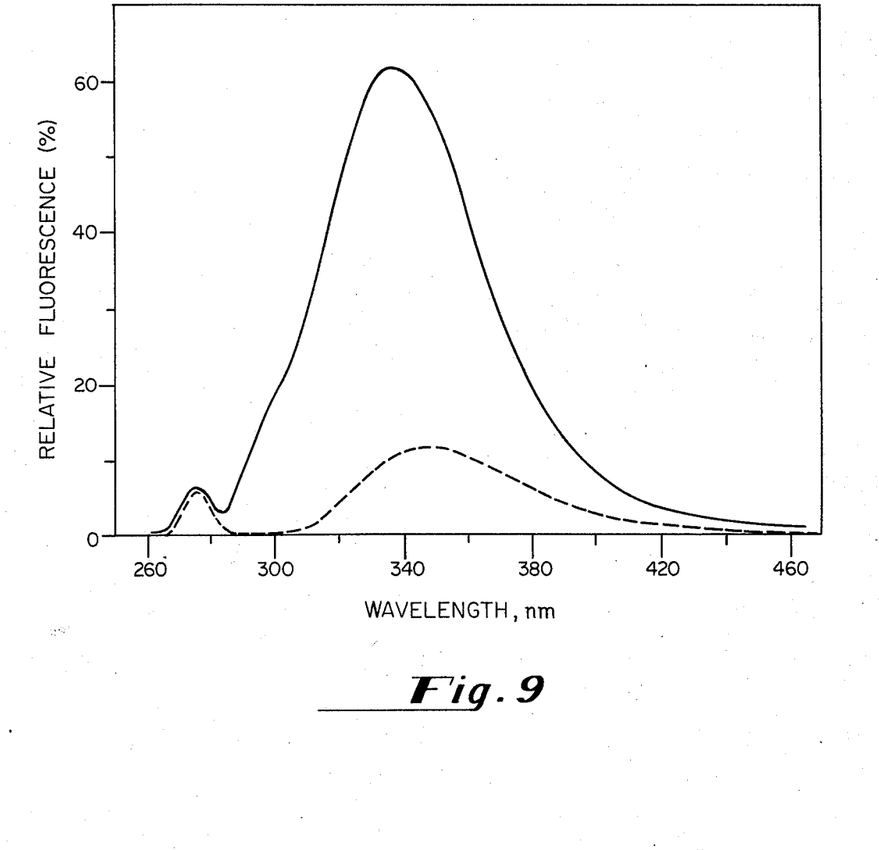
FIG. 9 is a fluorescense emission spectrum of the product of this invention.

The fluorescence emission maximum (excitation at 277 nm) of monellin is at 337 nm due to tryptophan; a shoulder at 300 nm due to tyrosine could be partially resolved (FIG. 9). In 0.1N NaOH the emission maximum is shifted to 348 nm, with a marked loss in tryptophan fluorescence itensity (—) Emission spectrum of monellin in water; ( ----- ) emission sepctrum of monellin in 0.1 N NaOH.

Infrared absorption spectrum — (KBr pellet): Monellin exhibits characteristic absorption at the following wave lengths expressed in reciprocal centimeters:

3355 (broad)
3290
2970
1658
1640
1532 (broad)
1243

Molecular formula: calculated from amino acid content — $C_{486}H_{755}N_{131}O_{139}S_2$. Elemental analysis (found): C, 45.68; H, 6.22; N, 14.13; S, 1.32; O (by difference), 32.65.

Figure 10:
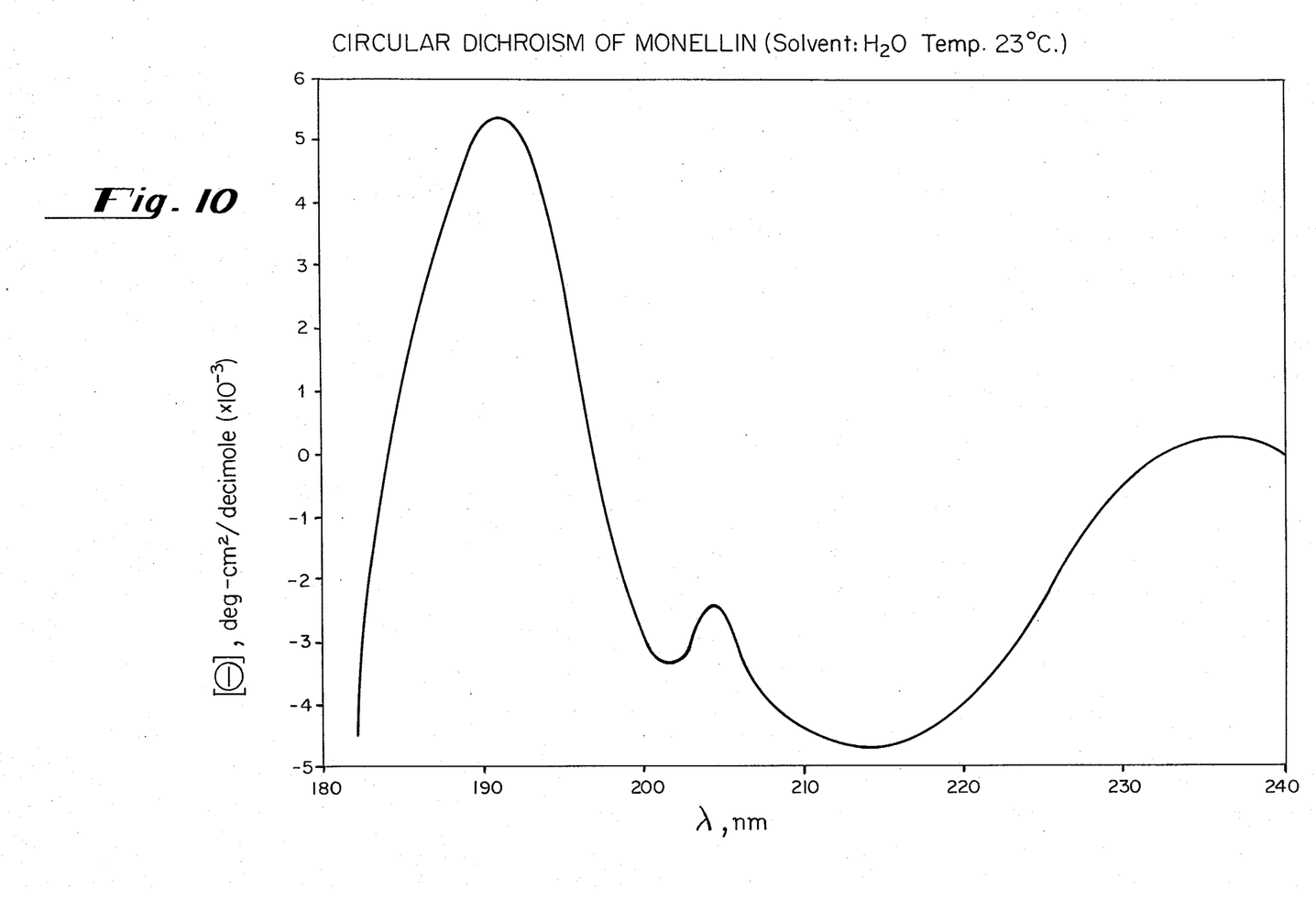
FIG. 10 is a graph showing the circular dichroism of monellin.

Monellin exhibits circular dichroism as shown in FIG. 10.

TABLE II

| Amino acid composition of native monellin[a] | |
|---|---|
| Amino acid | Residues/mole[b] |
| Tryptophan | 1.42 |
| Lysine | 8.35 |
| Histidine | 0 |

TABLE II-continued

| Amino acid composition of native monellin[a] | |
|---|---|
| Amino acid | Residues/mole[b] |
| Ammonia | 7.52 |
| Arginine | 7.03 |
| Aspartic acid | 10.05 |
| Threonine | 3.34 |
| Serine | 0.91 |
| Glutamic acid | 12.67 |
| Proline | 6.32 |
| Glycine | 7.75 |
| Alanine | 2.96 |
| Half cystine[c] | 0 |
| Valine | 3.71 |
| Methionine | 1.00 |
| Isoleucine | 6.24 |
| Leucine | 5.62 |
| Tyrosine | 6.69 |
| Phenylalanine | 5.48 |

[a]The result represents the average of analyses carried out in duplicate on a single sample of hydrolyzate. Hydrolysis was performed in the presence of thioglycolic acid.
[b]The residues per mole of protein were calculated by normalizing to to methionine.
[c]Analyses of proteins hydrolyzed in the presence of thioglycolic acid revealed a peak that emerged 5–7 min. after authentic cystine and whose absorbance was primarily at 440 nm. The presence of cysteine could not be detected.

TABLE III

| Amino acid composition of native and performic acid-oxidized monellin[a] | | |
|---|---|---|
| Amino acid | Native Monellin | Oxidized Monellin |
| | residues/mole[b] | |
| Tryptophan | 0.31 | — |
| Lysine | 8.29 | 10.15 |
| Histidine | 0 | 0 |
| Ammonia | 5.47 | — |
| Arginine | 7.17 | 7.24 |
| Aspartic acid | 9.78 | 10.03 |
| Threonine | 3.68 | 3.77 |
| Serine | 1.78 | 1.78 |
| Glutamic acid | 11.88 | 11.86 |
| Proline | 6.62 | 6.36 |
| Glycine | 7.78 | 7.88 |
| Alanine | 3.00 | 3.00 |
| Half cystine | 0 | 0.89[c] |
| Valine | 3.79 | 3.72 |
| Methionine | 0.89 | 0.94[d] |
| Isoleucine | 5.94 | 5.94 |
| Leucine | 5.45 | 5.26 |
| Tyrosine | 6.63 | 0 |
| Phenylalanine | 4.86 | 4.57 |

[a]Samples of native and oxidized proteins from the same preparation of monellin were hydrolyzed simultaneously in the same desiccator in the absence of thioglycolic acid. Each result represents the average of analyses carried out in duplicate on a single hydrolyzate.
[b]The residues per mole were calculated on the basis of 3 residues of alanine per mole of protein.
[c]Determined as cysteic acid.
[d]Determined as methionine sulfone.

TABLE I

Purification of Monellin

| Fraction | Vol. (ml) | Protein (mg/ml) | Total protein (mg) | Carbohydrate (mg/ml) | Total carbohydrate (mg) | Sweetener activity (units/ml) | Sweetener specific activity (units/mg) | Total sweetener | Recovery (%) |
|---|---|---|---|---|---|---|---|---|---|
| Crude extract | 1450 | 0.71 | 1030 | 0.75 | 1088 | 40 | 56 | 58 000 | 100 |
| P 40-60 | 108 | 4.84 | 523 | 4.98 | 538 | 500 | 103 | 54 000 | 93 |
| DEAE-Cellulose eluate | 550 | 0.55 | 302 | 0.83 | 456 | 100 | 182 | 55 000 | 95 |
| CM-Cellulose eluate-I | 64 | 2.03 | 130 | 0.00* | 0 | 500 | 246 | 32 000 | 55 |

*Lower limit of detection is 5 μg/ml.

TABLE IV

| Amino acid composition of monellin[a] | | |
|---|---|---|
| Amino Acid | Residues/mole[b] | Probable integral number |
| Tryptophan | 1.0 | 1 |
| Lysine | 8.4 | 8 |
| Histidine | 0 | 0 |
| Arginine | 7.1 | 7 |

TABLE IV-continued

Amino acid composition of monellin[a]

| Amino Acid | Residues/mole[b] | Probable integral number |
|---|---|---|
| Aspartic Acid | 10.0 | 10 |
| Threonine | 3.5 | 4 |
| Serine | 1.4 | 2 |
| Glutamic acid | 12.1 | 12 |
| Proline | 6.5 | 6 |
| Glycine | 7.8 | 8 |
| Alanine | 3.0 | 3 |
| Cysteine | 0.9 | 1 |
| Cystine | 0 | 0 |
| Valine | 3.7 | 4 |
| Methionine | 0.9 | 1 |
| Isoleucine | 6.1 | 6 |
| Leucine | 5.5 | 6 |
| Tyrosine | 6.7 | 7 |
| Phenylalanine | 5.0 | 5 |
| Total number of residues | | 91 |
| Calculated molecular weight | | 10,700 |

[a] The result represents the average of six standard analyses, including the data in Tables II and III. (Not included in the average are the values of tryptophan obtained in the absence of thioglycolic acid and of lysine and tyrosine obtained with the performic acid oxidized protein.)
[b] The residues per mole were calculated on the basis of 3 residues of alanine per mole of protein.

TABLE V

Extinction coefficients of monellin

| ph | Absorption Maximum | $E_{1\,cm}^{1\%}$ | $\epsilon(M^{-1}cm^{-1})$ [a] |
|---|---|---|---|
| 7.20 | 277 | 13.7 | $1.47 \times 10^4$ |
| 12.8 | 290 | 17.1 | $1.83 \times 10^4$ |

[a] A molecular weight value of monellin of 10,700 was used in the calculations.

Having thus described my invention, I claim:

1. A sweet substance consisting essentially of the essentially pure, intensely sweet principle of the fruit *Dioscoreophyllum cumminsii* (Diels) extracted from the crude fresh fruit of *Dioscoreophyllum cumminsii*, substantially free from carbohydrate, which is a single homogeneous protein having intensely sweet taste characterized by: MW, 10,700; isoelectric point, 9.3; u.v. absorption maximum ($\lambda$max = 277 nm); extinction coefficient at pH 7.2, $1.47 \times 10^4 M^{-1} cm^{-1}$ ($\lambda$max — 277 nm); extinction coefficient at pH 12.8, $1.83 \times 10^4 M^{-1} cm^{-1}$ ($\lambda$max =290 nm); infrared absorption spectrum (KBr pellet) expressed in reciprocal centimeters: 3355 (broad), 3290, 2970, 1658, 1640, 1532 (broad), 1243; molecular formula: $C_{486}H_{755}N_{131}O_{139}S_2$; elemental analysis: C, 45.68; H, 6.22; N, 14.13; S, 1.32; O (by difference), 32.65; having a circular dichroism and having the approximate integral amino acid residues per mol as follows

| Amino Acid | Integral No. of Residues/Mole |
|---|---|
| Tryptohan | 1 |
| Lysine | 8 |
| Histidine | 0 |
| Arginine | 7 |
| Aspartic Acid (+ Asparagine) | 10 |
| Threonine | 4 |
| Serine | 2 |
| Glutamic Acid (+ Glutamine) | 12 |
| Prline | 6 |
| Glycine | 8 |
| Alanine | 3 |
| Cysteine | 1 |
| Cystine | 0 |
| Valine | 4 |
| Methionine | 1 |
| Isoleucine | 6 |
| Leucine | 6 |
| Tyrosine | 7 |
| Phenylalanine | 5 |

\* \* \* \* \*